US009763149B2

(12) United States Patent
Kim et al.

(10) Patent No.: US 9,763,149 B2
(45) Date of Patent: Sep. 12, 2017

(54) METHOD AND DEVICE FOR SUPPORTING MOBILITY OF MOBILE TERMINAL IN DISTRIBUTED MOBILE NETWORK BASED ON A SOFTWARE-DEFINED NETWORK

(71) Applicant: Foundation of Soongsil University-Industry Cooperation, Seoul (KR)

(72) Inventors: Young Han Kim, Seoul (KR); Kyoung Jae Sun, Seoul (KR)

(73) Assignee: Foundation of Soongsil University-Industry Cooperation, Seoul (KR)

( * ) Notice: Subject to any disclaimer, the term of this patent is extended or adjusted under 35 U.S.C. 154(b) by 164 days.

(21) Appl. No.: 14/750,377

(22) Filed: Jun. 25, 2015

(65) Prior Publication Data

US 2016/0100340 A1   Apr. 7, 2016

(30) Foreign Application Priority Data

Oct. 7, 2014 (KR) .......................... 10-2014-0134731

(51) Int. Cl.
*H04W 36/24* (2009.01)
*H04W 36/32* (2009.01)
(Continued)

(52) U.S. Cl.
CPC ........ *H04W 36/0083* (2013.01); *H04W 36/08* (2013.01); *H04W 36/245* (2013.01)

(58) Field of Classification Search
CPC ............. H04W 36/0083; H04W 36/08; H04W 36/245; H04W 36/32
See application file for complete search history.

(56) References Cited

U.S. PATENT DOCUMENTS 7,822,065 B2 * 10/2010 Lu .......................... H04W 88/02
370/328
8,588,787 B2 * 11/2013 Murakami .......... H04W 36/245
370/331
(Continued)

FOREIGN PATENT DOCUMENTS

KR   10-2009-0053911   5/2009
KR   10-2010-0109955   10/2010

OTHER PUBLICATIONS

Dely et al., "A software-defined networking approach for handover management with real-time video in WLANs," J. Mod. Transport. (2013) 21(1):58-65.
(Continued)

*Primary Examiner* — Ahmed Elallam
(74) *Attorney, Agent, or Firm* — Mintz Levin Cohn Ferris Glovsky and Popeo, P.C.; Kongsik Kim; Jonathon Western

(57) ABSTRACT

A method and a system for supporting mobility of a mobile terminal in a distributed mobile network based on a SDN are disclosed. A method of supporting a fast handover of a mobile terminal in a node-B (eNB) includes the steps of: receiving a handover initiation message from the mobile terminal, the handover initiation message including identification information and signal strength of a target eNB; determining whether or not for a fast handover trigger using the signal strength of the target eNB and movement history of the mobile terminal previously stored; and when it is determined as the fast handover trigger, transmitting a handover request message and a rule for the handover to the target eNB by using the identification information of the target eNB.

11 Claims, 6 Drawing Sheets

(51) Int. Cl.
H04W 36/00 (2009.01)
H04W 36/08 (2009.01)

(56) References Cited

U.S. PATENT DOCUMENTS

| | | | | |
|---|---|---|---|---|
| 9,565,609 B2* | 2/2017 | Kuusilinna | ............ | H04W 64/00 |
| 2007/0105589 A1* | 5/2007 | Lu | ......................... | H04W 88/02 |
| | | | | 455/556.2 |
| 2010/0008291 A1* | 1/2010 | Leblanc | .................. | H04L 45/24 |
| | | | | 370/328 |
| 2010/0124203 A1* | 5/2010 | Tenny | ................... | H04W 36/24 |
| | | | | 370/331 |
| 2012/0039181 A1* | 2/2012 | Aziz | ................... | H04W 36/245 |
| | | | | 370/241 |
| 2012/0088507 A1* | 4/2012 | Legg | ................... | H04W 36/245 |
| | | | | 455/436 |
| 2012/0157105 A1* | 6/2012 | Grob-Lipski | ......... | H04W 36/32 |
| | | | | 455/437 |
| 2013/0083773 A1* | 4/2013 | Watfa | ................ | H04W 36/0033 |
| | | | | 370/331 |
| 2014/0087729 A1* | 3/2014 | Olofsson | ........... | H04W 36/0083 |
| | | | | 455/436 |
| 2014/0307708 A1* | 10/2014 | Son | ................... | H04W 36/0055 |
| | | | | 370/331 |
| 2015/0085845 A1* | 3/2015 | Wang | .................. | H04W 76/022 |
| | | | | 370/338 |
| 2015/0141018 A1* | 5/2015 | Kapoulas | .......... | H04W 36/0083 |
| | | | | 455/437 |
| 2015/0141021 A1* | 5/2015 | Kapoulas | ............... | H04W 36/32 |
| | | | | 455/441 |
| 2015/0282017 A1* | 10/2015 | Wang | ...................... | H04W 8/02 |
| | | | | 370/331 |
| 2015/0304920 A1* | 10/2015 | Cootey | ................. | H04W 28/18 |
| | | | | 455/436 |
| 2015/0327148 A1* | 11/2015 | Agarwal | ................ | H04W 24/02 |
| | | | | 370/328 |
| 2016/0021684 A1* | 1/2016 | Lewis | ................... | H04W 76/02 |
| | | | | 370/329 |
| 2016/0337914 A1* | 11/2016 | Hoffmann | ......... | H04W 36/0083 |

OTHER PUBLICATIONS

Yang et al., "Routing Optimization with SDN," Soongsil University, Apr. 22, 2014, pp. 1-9.

\* cited by examiner

FIG. 2

| MN-ID | First Attach | Second Attach |
|-------|--------------|---------------|
| MN 1  | SWID 1       |               |
|       |              |               |
|       |              |               |

METHOD AND DEVICE FOR SUPPORTING MOBILITY OF MOBILE TERMINAL IN DISTRIBUTED MOBILE NETWORK BASED ON A SOFTWARE-DEFINED NETWORK

CROSS-REFERENCE TO RELATED APPLICATIONS

This application claims priority of Korean Patent Application No. 10-2014-0134731, filed on Oct. 7, 2014, which is hereby incorporated by reference in its entirety.

BACKGROUND

Technical Field

The present invention relates to a network, and more particularly, to a method and device for supporting mobility of a mobile terminal in a distributed mobile network based on SDN.

Description of the Related Art

In a conventional art, SDN-based network architecture is well-defined and the definitions for each component are also included therein. However, it is necessary to take into account the messages used in a mobile communication network to apply the conventional SDN based network to a mobile communication network. The messages used in the mobile communication network are different from those in the processes performed in a typical wireless LAN.

In the case of the typical wireless LAN, in the SDN-based network, a traffic path is established by the messages sent after a terminal is accessed. In this case, there is an advantage that the path of the terminal can be changed in real time, but there is a problem that it requires the process of setting a new path in order to keep the traffic at the new access point when the terminal moves, which results in problems such as a packet loss and an increase in delay time. Further, in the SDN-based network, there is a problem that the packet loss is created while the terminal is moving because there is no preparation for the mobility.

SUMMARY

The present invention provides a method and a device for supporting the mobility of a mobile terminal in a distributed mobile network based on a software-defined networking (SDN), which can define message exchange procedures for terminal mobility in the distributed mobile network based on the SDN and support a fast handover to minimize a packet loss of a terminal.

Further, the present invention provides a method and a device for supporting mobility of a mobile terminal in a distributed mobile network based on a software-defined networking (SDN), which can support a rapid mobility through the exchange of messages between wireless access points without passing through a controller when a terminal moves within a short distance in a distributed mobile network based on a software-defined networking (SDN).

In addition, the present invention provides a method and a device for supporting mobility of a mobile terminal in a distributed mobile network based on a software-defined networking (SDN), which can minimize a packet loss even when a terminal is moving within a local network by setting a temporary route and an actual route within the network before the mobile terminal moves when performing a mobility procedure of the mobile terminal.

According to one aspect of the invention, a method for supporting mobility of a mobile terminal in a distributed mobile network based on a software-defined networking (SDN), which can define message exchange procedures for terminal mobility in the distributed mobile network based on the SDN and support a fast handover to minimize a packet loss of a terminal.

According to one embodiment of the present invention, a method for supporting mobility of a mobile terminal in a distributed mobile network based on a software-defined networking (SDN), includes a method of supporting a fast handover of a mobile terminal in a node-B (eNB), wherein the method includes the steps of: receiving a handover initiation message from the mobile terminal, the handover initiation message including identification information of a target eNB and a signal strength thereof; determining whether for a fast handover trigger using the signal strength of the target eNB and the movement history of the mobile terminal previously stored; and if it is determined as the fast handover trigger, transmitting a handover request message and a rule for the handover to the target eNB by using the identification information of the target eNB.

The step of determining whether for the fast handover trigger includes determining the fast handover trigger when the signal strength of the target eNB is stronger than the signal strength of the eNB and the movement history of the mobile terminal is within a reference number of times or the target eNB to which the mobile terminal moves is within the eNB and a reference hop, with reference to the movement history of the mobile terminal.

If a response message to the handover request message is received from the target eNB, the method further includes the step of setting up the target eNB and a temporary path; and the step of transmitting a handover command to the mobile terminal, wherein a data packet to the mobile terminal may be temporarily stored in the target eNB through the temporary path as set up.

The mobile terminal receiving the handover command transmits a handover confirmation message (Handover Confirm) to the target eNB, wherein the target eNB may transmit the temporarily stored data packet to the mobile terminal according to the reception of the handover confirmation message.

The mobile terminal transmits a handover complete message (Handover Complete) to the target eNB when the data packet is received from the target eNB, and the target eNB transmits the handover complete message to a local controller, wherein the local controller may transmit a location change of the mobile terminal to a core controller according to the reception of the handover complete message.

The step of determining whether for the fast handover trigger includes determining the handover trigger when the signal strength of the target eNB is stronger than the signal strength of the eNB and the movement history of the mobile terminal exceeds the reference number of times based on the movement history of the mobile terminal or the target eNB to which the mobile terminal moves is more than the eNB and the reference hop.

When it is determined as the handover trigger, the method further includes the steps of: transmitting a handover request message to a source local controller; receiving the handover request message and a path generation response message from the source local controller; forming the target eNB and the temporary path according to the path generation message; and transmitting the handover command to the mobile terminal according to the handover request response message, wherein the data packet to the mobile terminal may be temporarily stored in the target eNB.

The mobile terminal transmits the handover confirmation message to the target eNB according to the handover command, wherein, when the target eNB receives the handover confirmation message, the target eNB transmits the temporarily stored data packets to the mobile terminal and transmits a path change request to the source local controller to change a routing path.

According to another embodiment of the present invention, a method for supporting mobility of a mobile terminal in a distributed mobile network based on a software-defined networking (SDN) includes the steps of: when a handover request message for the mobile terminal is received through a core controller, transmitting, by a target local controller, a tunnel setup message to a target gateway, and transmitting a handover request response message to the source local controller through the core controller; when the source local controller receives the handover request response message from the target local controller, transmitting the tunnel setup message to the source gateway, and transmitting the handover request response message to a source eNB; transmitting, by the source eNB, the handover command for performing a handover procedure of the mobile terminal; and updating, by the target eNB, a position change of the mobile terminal to the core controller in response to a wireless access according to the handover of the mobile terminal, wherein the source gateway forms an IP tunnel together with the target gateway according to the tunnel setup message.

According to another aspect of the present invention, the present invention provides a device for defining a message exchange procedure for mobility of a terminal in a distributed mobile network based on a SDN and supporting a fast handover, which is capable of minimizing a packet loss of a terminal.

According to one embodiment of the present invention, the present invention provides a node-B (eNode B) for supporting a fast handover of a mobile terminal, includes: a receiver receiving a handover initiation message from the mobile terminal, the handover initiation message including identification information of a target eNB and a signal strength; a trigger determining unit determining whether for a fast handover trigger by using the signal strength of the target eNB and a movement history of the mobile terminal previously stored; and a rule generation unit generating a rule for the handover when it is determined as the fast handover trigger; and a transmitter transmitting the rule for the handover and a handover request message to the target eNB by using the identification information of the target eNB.

According to the present invention, there is also an advantage of minimizing the packet loss even when the terminal is moving within a local network by setting a temporary route and an actual route within the network before the mobile terminal moves when performing a mobility procedure of the mobile terminal.

BRIEF DESCRIPTION OF THE DRAWINGS

FIG. 2 is a view illustrating a movement history of a mobile terminal stored in an eNB according to an embodiment of the present invention.

DETAILED DESCRIPTION

Figure 1:
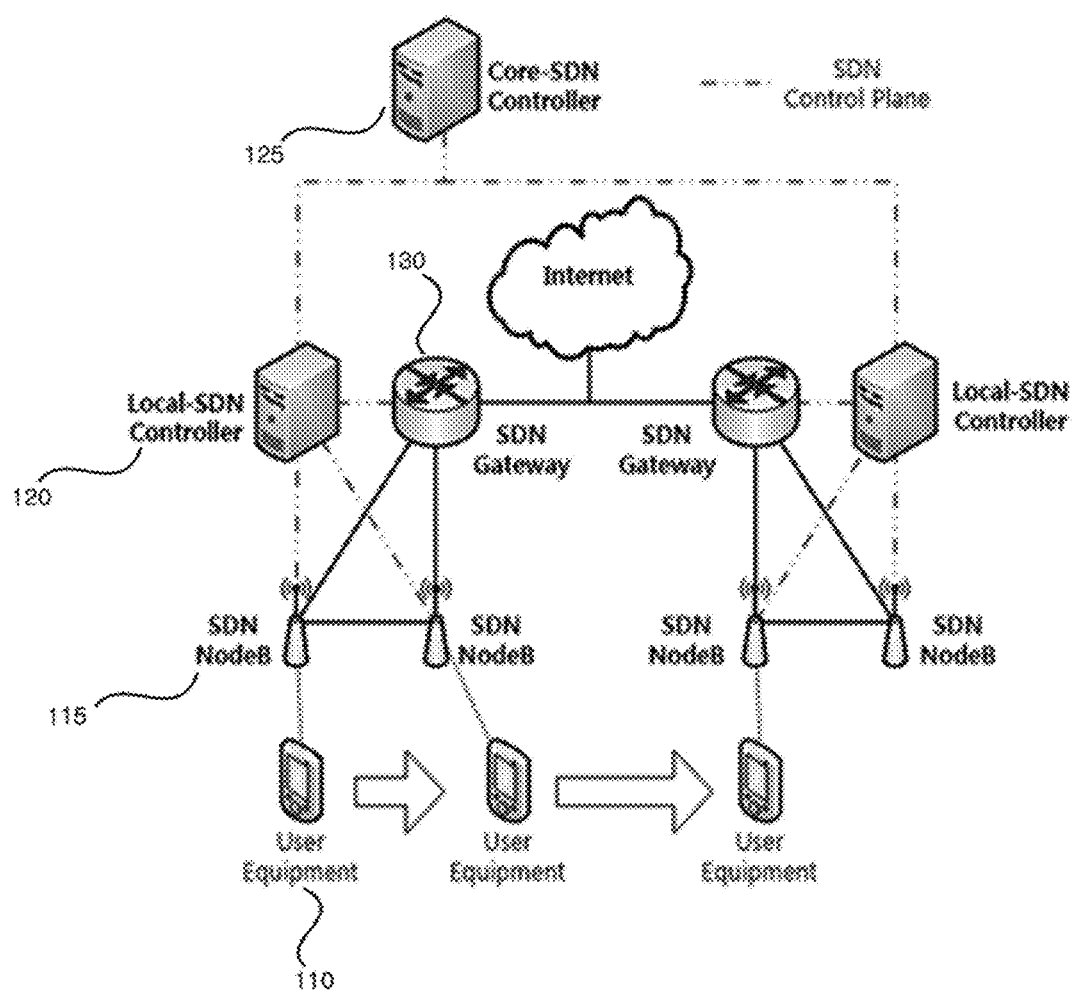
FIG. 1 is a schematic diagram showing the structure of a distributed mobile network system based on SDN according to an embodiment of the present invention.

As the present invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In the written description, certain detailed explanations of related art are omitted when it is deemed that they may unnecessarily obscure the essence of the present invention.

While such terms as "first" and "second," etc., may be used to describe various components, such components must not be limited to the above terms. The above terms are used only to distinguish one component from another.

The terms used in the present specification are merely used to describe particular embodiments, and are not intended to limit the present invention. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Certain embodiments of the invention will be described below in more detail with reference to the accompanying drawings.

Figure 2:
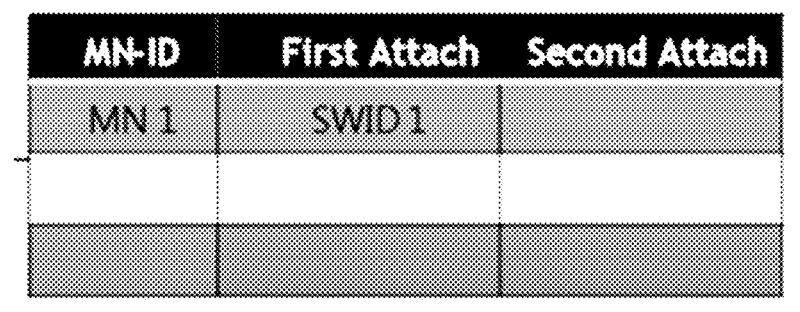

FIG. 1 is a schematic diagram illustrating the structure of the SDN-based distributed mobile network system according to an embodiment of the present invention, FIG. 2 is a view illustrating the movement history of the mobile terminal stored in the eNB according to an embodiment of the present invention.

Referring to FIG. 1, the distributed mobile network system based on the SDN according to an embodiment of the invention includes a mobile terminal 110, at least one base station 115, at least one local controller 120, at least one core controller 125 and gateway 130.

The mobile terminal 110 is a portable electronic device that a user can carry, and provides the function of communication with another mobile terminal 110 via a distributed mobile network system based on the SDN. For example, the mobile terminal 110 may be a mobile communication terminal, a notebook or the like.

The base station 115 performs the function that is responsible for a physical wireless access (radio physical channel setting, channel coding, modulation and demodulation, etc.) with the mobile terminal 110. The base station 115 may be, for example, an eNode B (hereinafter referred to as eNB). Hereinafter, since the common feature of the eNB is already well known to those skilled in the art, the additional descriptions for the eNB will be omitted, and only the different features will be described in accordance with an embodiment of the present invention.

The base station 115 according to one embodiment of the present invention may store the movement history according to the handover of the mobile terminal 110, and may support a fast handover for the mobile terminal 110 based on the movement history. Here, the movement history may be stored, for example, corresponding to identification information of the mobile terminal 110 (ID), movement route (e.g., base station identification information (SWID)) that the mobile terminal has been moved.

For example, the movement history may be stored by being accumulated as shown in FIG. 2.

The base station 115 may support the fast handover by using the stored movement history of the mobile terminal 110 until the number of times of the movement is more than the reference number of times or the traveling distance is more than a threshold hop (e.g., 2 hops) with reference to the access point to which the mobile terminal 110 is first accessed. However, the traveling distance is more than the threshold hop, the base station 115 may allow the handover to be performed through a controller.

In the embodiment of the present invention, the fast handover means that base station 115 itself performs a handover with respect to the mobile terminal 110 without passing through the local controller 120 or the core controller 125. This will be described in detail below referring to the related drawings.

The local controller 120 is a SDN controller that locally manages the network, and performs a function of managing the position of the mobile terminal and setting the route between the corresponding local network transmission equipments.

The core controller 125 is a host controller including a number of the local controllers 120 and performs a function of managing information of a provider network and overall subscribers and policy management.

The gateway 130 is a place where the data of the mobile terminal 110 is delivered, and is connected to the outside thereof in the region of the local controller 120.

Figure 3:
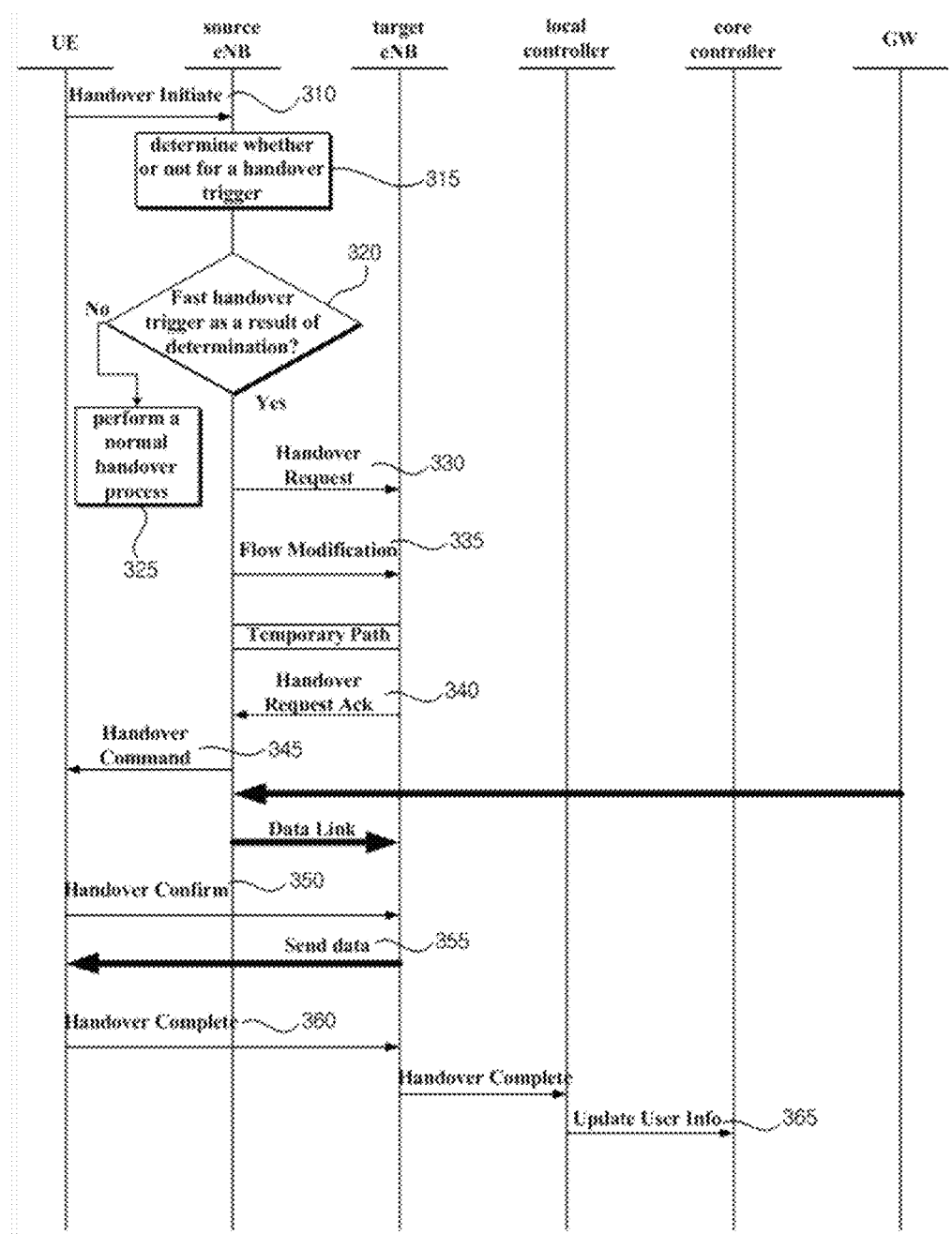
FIG. 3 is a flow diagram illustrating a method for supporting a fast handover in a station included in the distributed mobile network based on the SDN according to an embodiment of the present invention.

FIG. 3 is a flow diagram illustrating a method for supporting the fast handover at a base station included in the SDN-based distributed mobile network according to an embodiment of the present invention.

For this purpose, the base station (hereinafter referred to as eNB, for the convenience of explanation and understanding thereof) included in the SDN-based distributed mobile network according to an embodiment of the present invention will be described after assuming that the movement history of each mobile terminal 110 has been stored as shown in FIG. 2.

For the convenience of explanation and understanding, the eNB requesting a handover is referred to as a source eNB, the eNB receiving a request for the handover is referred to as a target eNB.

In step 310, the source eNB receives a handover initiation message (Handover Initiate) from the mobile terminal 110. Here, the handover initiation message includes the identification information of the target eNB as a handover target and information on signal strength of the target eNB.

The mobile terminal 110 may transmit and receive periodically/non-periodically signals through the fading channel between the eNBs in the area where the corresponding mobile terminal 110 is located, thereby receiving the signal strength of the eNBs. At this time, the mobile terminal 110 compares the signal strength of the eNB that is currently connected thereto and the signal strength of another eNB and transmits a handover request message to one eNB having a relatively stronger signal strength so that the mobile terminal 110 is connected to the eNB having the relatively stronger signal strength.

In step 315, the source eNB analyzes the handover initiation message received from the mobile terminal 110 to determine whether for a handover trigger.

For example, the source eNB extracts information on the handover initiation signal strength of the target eNB from the handover initiation message received from the mobile terminal 110, and analyzes the information to determine whether the signal strength of the target eNB is stronger than that of the source eNB itself thereby determining whether or not the handover is needed.

If the signal strength of the target eNB is not stronger than that of the source eNB itself, the source eNB in the embodiment of the present invention, in spite of the handover initiation message of the mobile terminal 110, may not perform the handover.

When it is determined as to whether the handover trigger is performed (e.g., when the signal strength of the target eNB is stronger than that of its own (i.e., source eNB itself), in step 320, the source eNB determines whether the result of whether for the handover trigger is corresponding to a fast handover trigger.

According to an embodiment of the present invention, the fast handover means performing a handover of a mobile terminal without passing through a controller using the information stored in the source eNB.

In the embodiment of the present invention, when the traveling distance of the mobile terminal is within the range of two hops or the number of times of movement of the mobile terminal is within the reference number of times, the fast handover trigger may be determined in the source eNB.

Therefore, when the signal strength of the target eNB is stronger than that of its own (source eNB), the source eNB refers to the stored movement history of the mobile terminal to determine whether or not the corresponding mobile terminal is in the range of two hops or the number of times of movement is within a reference number of times.

If the decision result does not indicate a fast handover trigger, in step 325, the eNB may transmit a handover request message to the local controller. This case will be described with reference to FIGS. 4 and 5.

However, if the decision result indicates a fast handover trigger, in step 330, the source eNB may transmit a handover request message to the target eNB to perform the fast handover. Here, the target eNB may be an adjacent eNB having a strong signal strength.

At the same time, the source eNB may change the movement history of the mobile terminal 110 through the target eNB to change the path for the packet of the mobile terminal 110.

In step 335, the source eNB transmits a flow modification message (Flow modification) to the target eNB. Here, the flow modification message may include the address information of the mobile terminal. After receiving the flow modification message from the source eNB, a temporary path is formed between the source eNB and the target eNB.

The target eNB may receive, via the temporary path, data packets addressed to the mobile terminal 110 to store it temporarily.

In step 340, the target eNB having received the address information of the mobile terminal through the flow modification message sets a path for the mobile terminal and then transmits a response message (Handover Request Ack) to the handover request message to the source eNB.

In step 345, when the source eNB receives handover response message from the target eNB, it determines that the preparation for the handover is completed and transmits a handover command (Handover Command) for a handover of a mobile terminal to the mobile terminal 110.

In step 350, the mobile terminal 110 performs an access procedure to the target eNB according to the handover command from the source eNB. That is, the mobile terminal 110 transmits the handover confirmation message to the target eNB according to the handover command from the source eNB. As such, while the mobile terminal 110 performs the handover, the packet directed towards the mobile terminal 110 may be temporarily stored in the target eNB through the tunnel temporarily formed between the the source eNB and the target eNB.

In step 355, the target eNB transmits the temporarily stored data packets 110 to the mobile terminal 110 according to a wireless connection of the mobile terminal 110.

In step 360, when the mobile terminal 110 receives the temporarily stored data packet via the target eNB, it determines that the handover is completed and transmits the handover complete message (Handover Complete) to the local controller.

Next, in step 365, when the local controller receives the handover complete message for the mobile terminal 110 through the target eNB, it updates the location change of the mobile terminal through the core controller.

Figure 4:
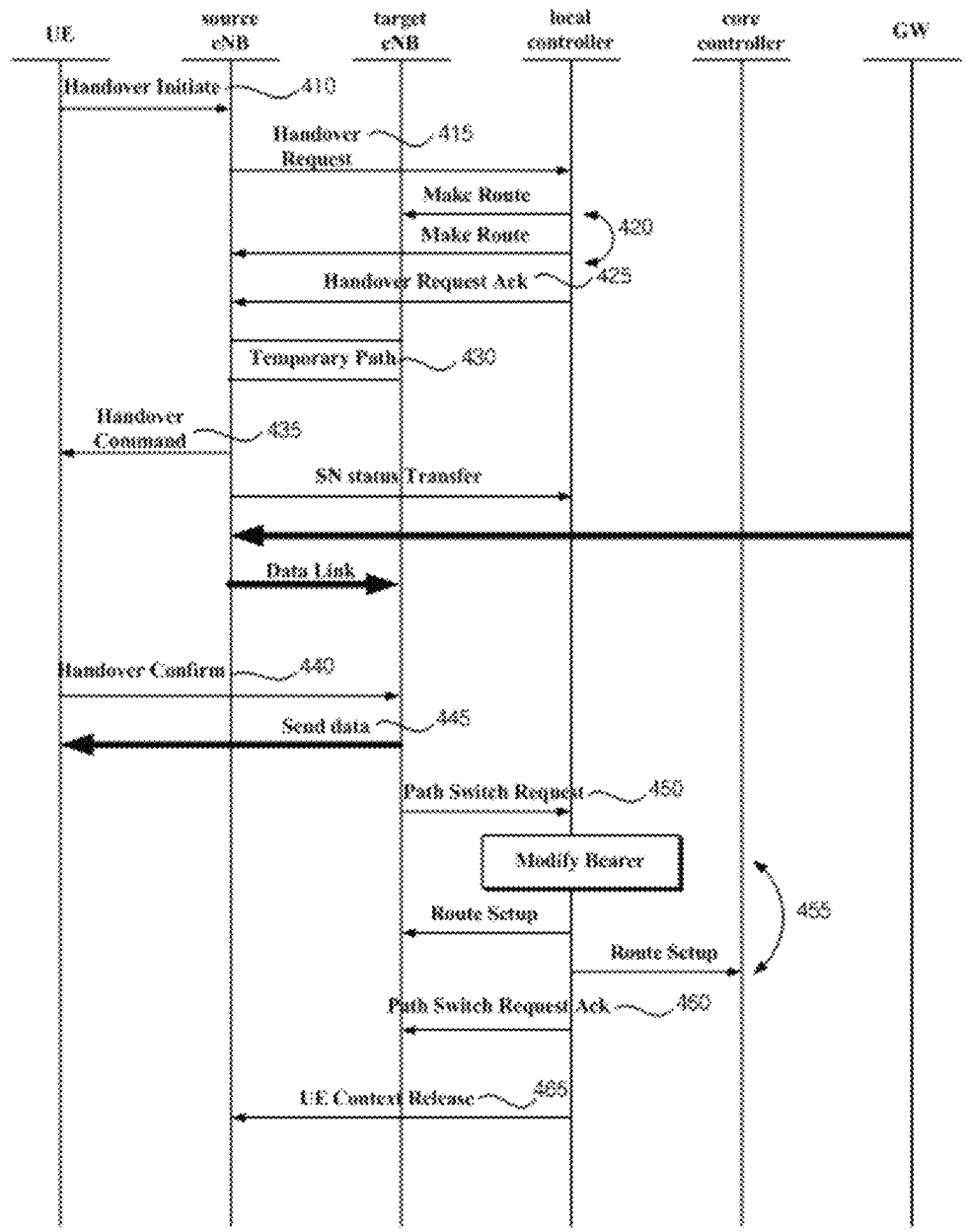
FIG. 4 is a flow diagram illustrating a handover procedure for the mobile terminal according to an embodiment of the present invention.

As shown in FIG. 3, the method for supporting, in the eNB, the fast handover for the mobile terminal 110 without control of a controller has been described. In FIG. 4, the handover process through a controller will be described.

FIG. 4 is a flow diagram illustrating a handover procedure for the mobile terminal according to an embodiment of the present invention. That is, as shown in FIG. 4, the handover procedure for the mobile terminal that occurs when a fast handover is not supported will be described.

In step 410, the mobile terminal 110 transmits the handover initiation message (Handover Initiation) to the source eNB. Here, the handover initiation message may include the identification information of the target eNB and the signal strength of the target eNB.

As shown in FIG. 3, the source eNB may determine whether for the handover trigger by analyzing the signal strength of the target eNB included in the handover initiation. Hereinafter, as shown in FIG. 4, the handover procedure when the fast handover trigger is not supported will be described.

In step 415, the source eNB transmits the handover request message (Handover Request) to the local controller in accordance with the reception of the handover initiation message of the mobile terminal 110.

Here, since whether for the possibility of the fast handover of the mobile terminal 110 is determined in the same manner as in FIG. 3, the repeated descriptions will be omitted and only the different procedures will be described. Here, the handover request message may include at least one of identification information, address, and signal strength of the target eNB.

In step 420, the local controller receives the handover request message from the source eNB and accordingly transmits a route generation message (Make Route (DL)) to the target eNB and the source eNB, respectively.

Next, in step 425, the local controller transmits a response message (Handover Request Ack) to the handover request message to the source eNB.

If the response message to the handover request message is received, in step 430, the source eNB forms the target eNB and the temporary path using the route setting method included in the route generation message received via the local controller. As such, the data packets directed toward the mobile terminal 110 after the temporary path is formed are not transmitted to the mobile terminal 110, but transmitted to the target eNB through the temporary path to temporarily store in the target eNB.

If the temporary path with the target eNB is complete, in step 435, the source eNB transmits the handover command (handover command) to the mobile terminal 110.

Accordingly, in step 440, the mobile terminal 110 requests a wireless access to the target eNB according to the handover command (Handover Confirm).

In step 445, the target eNB transmits the temporarily stored data packets to the mobile terminal 110 through the temporary path according to the wireless access request of the mobile terminal.

When the data packet transmission is complete, the target eNB, in step 450, transmits to the local controller a path switch request message (path switch request) for the actual route setup.

Accordingly, in step 455 the local controller modifies the bearer to set up the actual path as the path switch request message is received from the target eNB, and transmits the route setup message (Route Setup) to the target eNB and the gateway, respectively, after having acquired the policies.

According to the route setup messages, the target eNB may set up the actual path for the data packets according to the movement of the gateway and the mobile terminal.

Next, in step 460 the local controller transmits the response message to the route switch request message (Path Switch Request Ack) to the target eNB. In this way, when the path switch is complete, in step 465 the local controller transmits a terminal context release message (UE Context Release) to the source eNB.

Figure 5:
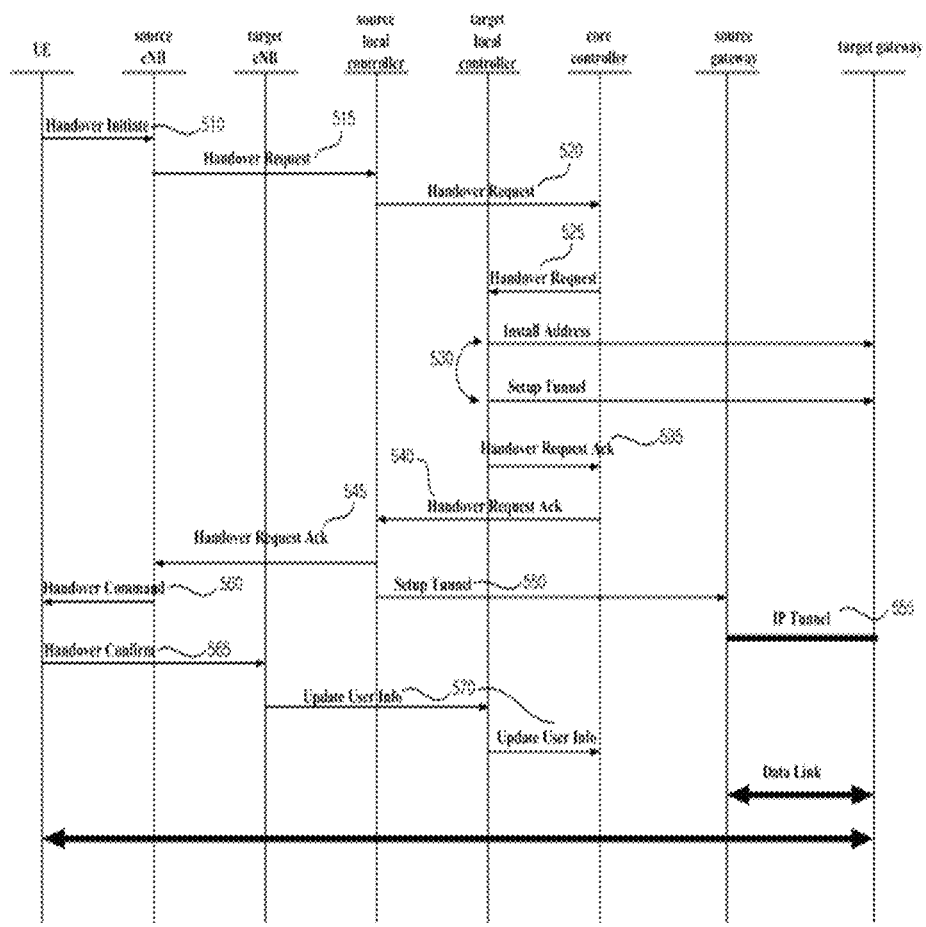
FIG. 5 is a flow diagram illustrating a handover procedure generated when the mobile terminal moves between the local controllers according to an embodiment of the present invention.

FIG. 5 is a flow diagram illustrating a handover process occurring when a mobile terminal moves between local controllers according to an embodiment of the present invention.

As shown in FIG. 5, in a situation where the mobile terminal 110 transmits and receives data packets through the source eNB and the source eNB transmits and receives data packets from the outside thereof through the gateway, the handover process in the case where the mobile terminal moves from the first local controller to the second local controller will be described.

In step 510 the mobile terminal 110 transmits the handover initiation message (handover initiate) to the source eNB. As already described above, the handover initiation message may include the identification information and the signal strength of the target eNB.

In step 515, if the source eNB determines the handover trigger by analyzing the handover initiation message, it transmits the handover request message (Handover Request) to the source local controller.

More specifically, the source eNB may determine whether the handover is needed after the extraction of the signal strength and identification information of the target eNB from the handover initiation message.

Since the handover trigger condition is the same as described with reference to FIGS. 3 and 4, the descriptions repeated regarding the handover trigger condition will be omitted.

However, if the source eNB is not determined as a fast handover trigger, it may transmit the handover request message to the source local controller.

Accordingly, in step 520, the source local controller receives the handover request message from the source eNB, and transmits the handover request message to the core controller because the target eNB included in the handover request message is not located within its corresponding source local controller.

It will be assumed that the source local controller has stored information (e.g., identification information) on the eNB that the corresponding source local controller controls.

Next, in step 525, the core controller checks the identification information of the target eNB in the handover request message received from the source local controller and transmits the handover request message to the target local controller where the corresponding target eNB is located.

It will be assumed that the core controller controls the information on each local controller and the eNB controlled by the each local controller.

In step 530, as the handover request message is received from the core controller, the target local controller sets a mobility support for the mobile terminal and sets the internal network route of even the eNB in the area where the mobile terminal 110 is to move.

In such a way, the gateway performs a mobility support routing with the source gateway connected to the current mobile terminal, which may result in a tunneling based on IP such as GTP, PMIPv6 or the like used in the existing mobile communication network.

More specifically, the target local controller transmits the tunnel setup message (Set Tunnel) after performing an address setting process (Install Address) to support the mobility of the mobile terminal to the target gateway.

Thereafter, in step 535, when the preparation in the network to which the mobile terminal moves is complete, the target local controller transmits the response message (Handover Request Ack) to the handover request to the core controller.

Accordingly, in step 540, the core controller transmits the handover request response message received through the target local controller to the source local controller.

Further, in step 545, when the handover request response message is received from the core controller, the source local controller transmits it to the source eNB.

In step 550, the source local controller transmits the tunnel setup message to the source gateway.

In step 555, the source gateway forms the IP tunnel with the target gateway according to the tunnel setup message from the source local controller.

Further, in step 560, the source gateway transmits the handover command to the mobile terminal 110 as the handover request response message is received from the source local controller.

Accordingly, in step 565, the mobile terminal 110 performs the wireless connection procedure to the target eNB (Handover Confirm).

In step 570, the target eNB transmits the user information update message (Update User Info) to the core controller through the target local controller in order to update the location change of the mobile terminal in the core controller according to the wireless access of the mobile terminal 110.

As described above, if the mobile terminal is accessed to a new network, the mobile terminal can communicate quickly and continuously through the path set in advance and the handover procedure can be completed by updating the location change of the terminal in the core controller after the handover has been performed.

Figure 6:
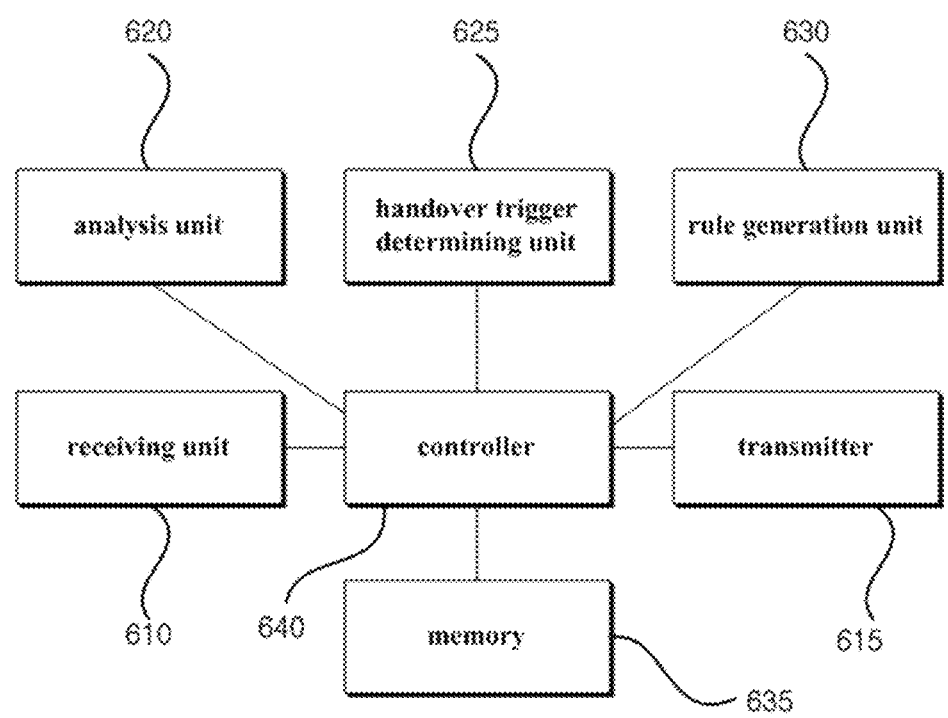
FIG. 6 is a schematic block diagram showing the internal structure of the eNB supporting the fast handover according to an embodiment of the present invention.

FIG. 6 is a schematic block diagram illustrating the internal structure of the eNB to support a fast handover according to an embodiment of the present invention.

Referring to FIG. 6, the eNB according to an embodiment of the present invention includes a receiving unit 610, a transmission unit 615, an analysis unit 620, a handover trigger determining unit 625, a rule generator 630, a memory 635 and a processor 640.

The receiving unit 610 is a means for receiving a variety of data and messages from the other devices (e.g., mobile terminal, local controller, etc.) from the SDN-based distributed mobile network.

The transmission unit 615 is a means for transmitting a variety of data and messages from the other devices (e.g., mobile terminal, local controller, etc) from the SDN-based distributed mobile network.

The analysis unit 620 is a means for analyzing and extracting the signal strength of the target eNB from the message received from the mobile terminal 110.

The handover trigger determining unit 625 is a means for triggering the handover by determining whether for a fast handover or a handover according to the analysis result of the analysis unit 620.

For example, the handover trigger determining unit 625 may determine the handover toward the target eNB when it is determined that the signal strength of the target eNB is stronger as an analysis result of the analysis unit 620.

At this time, the handover trigger determining unit 625 may determine whether to trigger a fast handover or a normal handover with reference to the movement history stored with respect to the mobile terminal 110.

For example, with reference to the movement history stored for the mobile terminal 110, if the mobile terminal 110 moves within two hops (hop), or the number of times of movement is within the reference number of times, the handover trigger determining unit 625 may determine to trigger the fast handover.

However, if the mobile terminal 110 moves two or more hops (hop) or the number of times of movement is more than the reference number of times, the handover trigger determining unit 625 may determine to trigger the normal handover.

If the fast handover trigger is determined in the handover trigger determining unit 625, the rule generation unit 630 performs a function of generating a rule (rule) to pass the fast handover to the target eNB.

Further, the rule generation unit 630 may allow the generated rules to be included in the flow modification message (flow modification) and then transmit the message to the target eNB. In addition, the rule generation unit 630 may modify the flow table stored so that the local controller may process the packets for the mobile terminal.

The memory 635 serves to store a variety of algorithms and data necessary to support the handover for the mobile terminal in the eNB according to an embodiment of the present invention.

The processor 640 is a means for controlling internal components (e.g., receiving unit 610, transmission unit 615, analysis unit 620, handover trigger determining unit 625, rule generation unit 630, and memory 635) of the eNB according to an embodiment of the present invention.

A method for supporting mobility of the mobile terminal in the SDN-based distributed mobile network according to an embodiment of the present invention can be implemented in the form of program instructions that may be performed using various computer means and can be recorded in a computer-readable medium. Such a computer-readable medium can include program instructions, data files, data structures, etc., alone or in combination.

Examples of the program of instructions may include not only machine language codes produced by a compiler but also high-level language codes that can be executed by a device for electronically processing information, such as a computer, through the use of an interpreter, etc.

The hardware mentioned above can be made to operate as one or more software modules that perform the actions of the embodiments of the invention, and vice versa.

While the present invention has been described above using particular examples, including specific elements, by way of limited embodiments and drawings, it is to be appreciated that these are provided merely to aid the overall understanding of the present invention, the present invention is not to be limited to the embodiments above, and various modifications and alterations can be made from the disclosures above by a person having ordinary skill in the technical field to which the present invention pertains.

What is claimed is:

1. A method for supporting a fast handover of a mobile terminal in an eNodeB (eNB) included in a software-defined networking (SDN)-based distributed network, the method comprising:
   receiving a handover initiation message from the mobile terminal, the handover initiation message including identification information and signal strength of a target eNB in the SDN-based distributed network;
   determining whether or not for a fast handover trigger using the signal strength of the target eNB and movement history of the mobile terminal previously stored; and
   when it is determined as the fast handover trigger, transmitting a handover request message for the fast handover to the target eNB by using the identification information of the target eNB.

2. The method of claim 1, wherein the step of determining whether or not for the fast handover trigger includes determining the fast handover trigger when the signal strength of the target eNB is stronger than a signal strength of the eNB and the movement history of the mobile terminal is within a reference number of times or the target eNB to which the mobile terminal moves is within the eNB and a reference hop, with reference to the movement history of the mobile terminal.

3. The method of claim 1, wherein, when a response message to the handover request message is received from the target eNB, the method further comprises the steps of: setting up the target eNB and a temporary path; and transmitting a handover command to the mobile terminal, wherein a data packet to the mobile terminal is temporarily stored in the target eNB through the temporary path set-up.

4. The method of claim 3, wherein the mobile terminal receiving the handover command transmits a handover confirmation message (Handover Confirm) to the target eNB, and the target eNB transmits the temporarily stored data packet to the mobile terminal according to the reception of the handover confirmation message.

5. The method of claim 4, wherein, when the data packet is received from the target eNB, the mobile terminal transmits a handover complete message (Handover Complete) to the target eNB, and the target eNB transmits the handover complete message to a local controller, wherein the local controller transmits a location change of the mobile terminal to a core controller according to the reception of the handover complete message.

6. The method of claim 1, wherein the step of determining whether or not for the fast handover trigger includes determining the handover trigger when the signal strength of the target eNB is stronger than the signal strength of the eNB and the movement history of the mobile terminal exceeds the reference number of times with reference to the movement history of the mobile terminal or the target eNB to which the mobile terminal moves is more than the eNB and a reference hop.

7. The method of 6, wherein, when it is determined as the handover trigger, the method further includes the steps of: transmitting the handover request message to a source local controller; receiving the handover request message and a path generation response message from the source local controller; forming the target eNB and a temporary path according to the path generation message; and transmitting the handover command to the mobile terminal according to the handover request response message, wherein the data packet to the mobile terminal is temporarily stored in the target eNB.

8. The method of claim 7, wherein the mobile terminal transmits a handover confirmation message to the target eNB according to the handover command, wherein, when the handover confirmation message is received, the target eNB transmits the temporarily stored data packets to the mobile terminal and transmits a path change request to the source local controller to change a routing path.

9. A method for supporting mobility of a mobile terminal in a software-defined networking (SDN)-based distributed mobile network including a core controller, a plurality of local controllers, a plurality of gateways, and a plurality of eNodeBs (eNBs), the method comprising:
   when a handover request message for the mobile terminal is received through the core controller, transmitting, by a target local controller among the plurality of local controllers, a tunnel setup message to a target gateway among the plurality of gateways, and transmitting a handover request response message to a source local controller among the plurality of local controllers through the core controller;
   when the source local controller receives the handover request response message from the target local controller, transmitting, by the source local controller, the tunnel setup message to a source gateway among the plurality of gateways, and transmitting the handover request response message to a source eNB among the plurality of eNBs;
   transmitting, by the source eNB, a handover command to perform a handover procedure of the mobile terminal; and
   updating, by a target eNB among the plurality of eNBs, a location change of the mobile terminal to the core controller in response to a wireless access according to a handover of the mobile terminal,
   wherein the source gateway forms an IP tunnel together with the target gateway according to the tunnel setup message.

10. A non-transitory computer-readable recording medium recording a program code for causing a processor to perform a method of supporting a fast handover of a mobile terminal in an eNodeB (eNB) included in a software-defined networking (SDN)-based distributed network, the processor performing the steps of:

receiving a handover initiation message from the mobile terminal, the handover initiation message including identification information and signal strength of a target eNB in the SDN-based distributed network;

determining whether or not for a fast handover trigger using the signal strength of the target eNB and movement history of the mobile terminal previously stored; and when it is determined as the fast handover trigger, transmitting a handover request message for the fast handover to the target eNB by using the identification information of the target eNB.

11. An eNodeB (eNB) included in a software-defined networking (SDN)-based distributed network for supporting a fast handover of a mobile terminal, the eNodeB comprising:

a receiver receiving a handover initiation message from the mobile terminal, the handover initiation message including identification information of a target eNB in the SDN-based distributed network and a signal strength thereof;

a trigger determining unit determining whether or not for a fast handover trigger by using the signal strength of the target eNB and a movement history of the mobile terminal previously stored; and a transmitter transmitting a handover request message for the fast handover to the target eNB by using the identification information of the target eNB when it is determined as the fast handover trigger.

* * * * *